Figure 1:
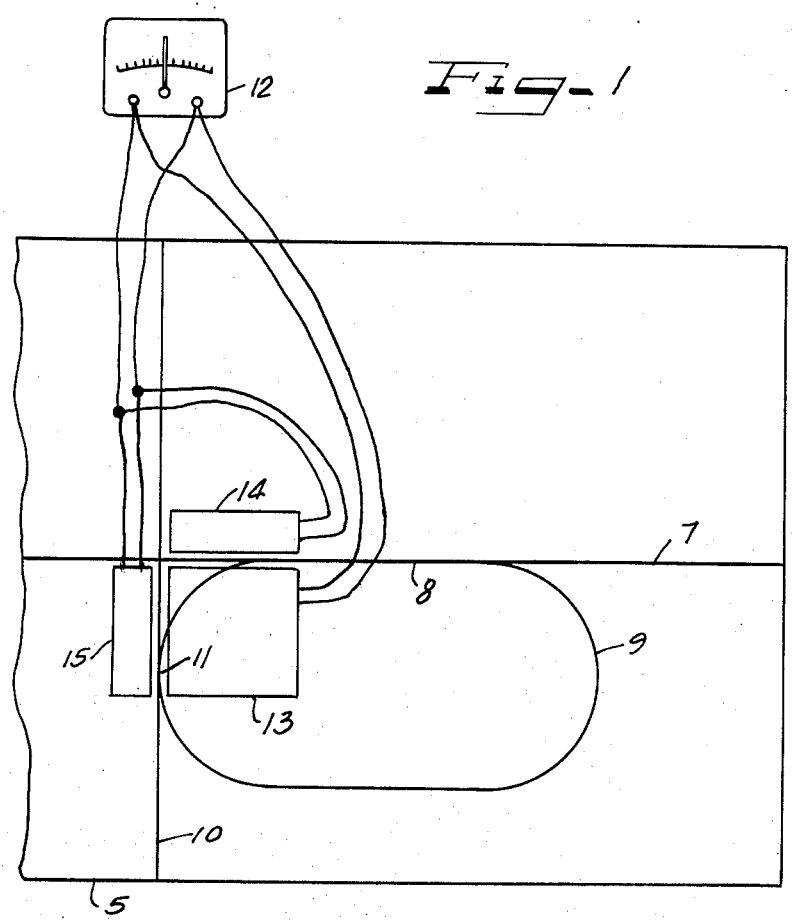

United States Patent [19]
Proefrock

[11] 3,791,740
[45] Feb. 12, 1974

[54] LOW COST HEADLIGHT TESTER AND METHOD

[75] Inventor: Paul R. Proefrock, Virden, Ill.

[73] Assignee: Dura Corporation, Springfield, Ill.

[22] Filed: June 14, 1972

[21] Appl. No.: 262,602

[52] U.S. Cl. .......... 356/121, 033/180 L, 250/220 M
[51] Int. Cl. .............................................. G01j 1/00
[58] Field of Search. 356/121, 122, 222; 033/180 L; 250/220 M

[56] References Cited
UNITED STATES PATENTS

| | | | |
|---|---|---|---|
| 3,386,333 | 6/1968 | Preston | 356/256 |
| 2,064,517 | 12/1936 | Brice | 356/222 |

*Primary Examiner*—John K. Corbin
*Assistant Examiner*—Steven K. Morrison
*Attorney, Agent, or Firm*—Hill, Sherman, Meroni, Gross & Simpson

[57] ABSTRACT

Three photoelectric devices are arranged cooperatively to enable reading on a single milliammeter both horizontal and vertical adjustments of an automotive vehicle headlight. One of the photoelectric devices is located in the high intensity zone of the testing area adjacent to a second of the photoelectric devices located in spaced relation above a predetermined desired position for the upper edge of the high intensity zone while the third photoelectric device is located in spaced relation relative to a predetermined desirable position for a vertical edge of the high intensity zone. Adjustments are effected sequentially, first either vertically or horizontally and then in the remaining mode with the milliammeter being read in each mode, and proper adjustment being determined by maximum reading attained on the milliammeter.

8 Claims, 2 Drawing Figures

LOW COST HEADLIGHT TESTER AND METHOD

This invention relates to new and improved apparatus and method for automotive vehicle headlight or headlamp testing, and is more particularly concerned with a low cost system for this purpose.

Proper alignment of one or both of the headlights or headlamps of automotive vehicles is required by various local, State and Federal inspection requirements and correct alignment is concerned with the upper horizontal and left vertical edges of the high intensity zone of the headlight beam pattern. One lighting inspection code requires alignment of the low beam light pattern such as that of a number 2 type headlight so the upper horizontal edge of the high intensity zone of the headlight is at the height of the horizontal centerline of the headlight when the pattern is projected on a screen at a distance of 25 feet. The code also requires that the left edge of the high intensity zone of the pattern be displaced approximately two inches to the right of the vertical centerline of the headlight to minimize glare to oncoming drivers during nighttime driving conditions.

Many types of devices and method for properly aiming headlights and testing headlight alignment have been proposed. One method utilizes mechanical devices mounted on the built-in aiming pads around the edge of the face of the headlight lens to position the plane of the aiming pads in correct relationship with the horizontal and vertical axes of the headlamp. However, due to manufacturing tolerances such as irregular beam patterns and variations in alignment of the plane of the aiming pads with the beam pattern edges, considerable variations in beam aim can result.

A second method for either aiming headlights or testing headlight alignment utilizes a screen having reference marks or lines and the operator visually locates the edges of the high intensity zone of the light beam with respect to the predetermined reference lines. However, such a method requires a darkened work area and is subject to operator errors due to judgment variations between operators as to the position of the edge of the high intensity zone.

A third method utilizes a device having photoelectric sensitive cells arranged in a pattern to indicate the center of the high intensity zone of the lamp. In such a device, the aiming of the center of the high intensity zone is believed to properly aim the left-hand vertical edge and the upper horizontal edge. However, due to variations in the size and shape of the zone, such devices do not necessarily provide consistent aiming of the left-hand vertical edge and the upper horizontal edge. This method can use an apparatus which is positioned adjacent to the headlight and examples of the type of apparatus are illustrated in U.S. Pat. No. 2,291,114, U.S. Pat. No. 2,308,095 and U.S. Pat. No. 2,714,327. This method has also been used with an aiming screen such as disclosed in U.S. Pat. No. 3,077,139.

A fourth method for aligning the left-hand vertical edge and the upper horizontal edge of high intensity zone of a headlight beam utilizes a projection board and an arrangement of photoelectric cells such as disclosed in U.S. Pats. No. 3,386,333, 3,467,473 and 3,532,432. In these patents three of four cells are aligned on a vertical line and three or four cells are placed on a horizontal line in a particular arrangement with regard to the desired reference lines for both the upper horizontal edge and the left-hand edge of the high intensity zone. In the device disclosed in U.S. Pat. No. 3,386,333, the output of each of the three cells is connected to a computer amplifier which obtains a factor or quantity by dividing the output of the cell disposed furthest in the high intensity zone by the difference of the intermediate cell minus the output of the cell disposed on the reference line. When the edge is properly aimed, the quantity or factor has a minimum value. In the device disclosed in U.S. Pat. No. 3,467,473, the outputs of the three cells are placed in a computer amplifier which takes the second differential of the output to give an indication which has its maximum value when the edge is properly aimed. In said U.S. Pat. No. 3,532,432 the four cell arrangement operates on the basis of computing the third derivative of the electrical signals. These systems are expensive to produce due to the electronic equipment necessary to utilize the outputs of the photo cells in the required mathematical formulas. Characteristic of all of these devices is the need for not only sophisticated electronic equipment of the computer type, but also the requirement for a plurality of meters.

An important object of the present invention is to overcome the foregoing and other disadvantages, deficiencies, inefficiencies, shortcomings and problems in prior methods and structures and to attain important advantages and improvements in a low cost headlight tester and method, as will hereinafter by clearly apparent.

Another object of the invention is to provide a headlight or lamp testing and aiming device and method utilizing a minimum of components and capable of being produced and sold at low cost.

A further object of the invention is to provide a new and improved headlight tester and method in which both vertical and horizontal testing is accomplished with three photoelectric devices and a single metering device.

Figure 2:
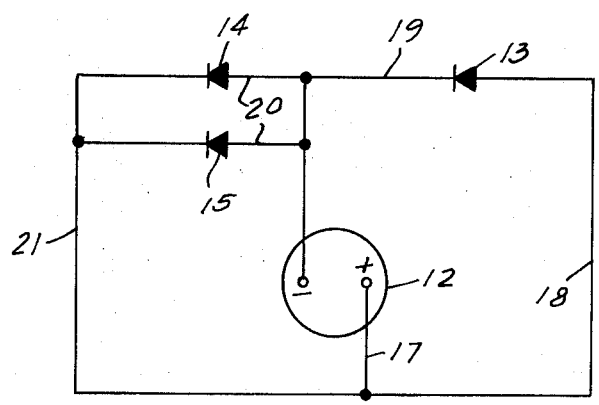

Other objects, features and advantages of the invention will be readily apparent fron the following description of a preferred embodiment thereof, taken in conjunction with the accompanying drawing, although variations and modifications may be effected without departing from the spirit and scope of the novel concepts embodied in the disclosure, and in which:

FIG. 1 is a schematic plan view of an aiming board, panel or screen and shows photoelectric device and meter device relationship for effecting headlamp testing according to the present invention; and FIG. 2 is a circuit diagram showing the manner in which the photoelectric devices cooperate with one another and the metering device.

According to the present invention, a headlight aiming and testing system for automotive vehicle headlights includes a traget member 5 such as a board, panel or screen having thereon a horizontal reference line 7 denoting a predetermined position for an upper generally horizontal edge 8 of a high intensity zone 9 of a headlight beam pattern, which is characteristically generally horizontally oval in shape. Crossing the line 7 is a vertical reference line 10 defining a predetermined position for a left generally vertical edge 11 of the high intensity zone 9. Location of the target member 5 in service is about 25' from the light source, or at least the equivalent of 25' where a reducing lens is employed between the light source and the target. While the target member 5 may be mounted in a stationary location and the headlight lamp itself adjusted to the stationary reference line positions, an adjustable mounting of the target member may be provided with associated calibration means such that the target can be adjusted to the beam pattern to determine misalignments and the degree of misalignment so that proper adjustments of the headlamp can be effected from such readings. In any such arrangement the testing procedure will involve substantial coincidence of the beam pattern horizontal edge 8 with the horizontal line 7 of the target area and the vertical edge 11 with the vertical line 10 of the target area.

According to the present invention, relative position of the horizontal and vertical edges 8 and 11 of the light beam pattern with respect to the position lines 7 and 10 of the target area are adapted to be indicated by a single meter device 12 comprising a milliammeter having the customary needle related to a milliammeter scale. Conversion of light from the beam pattern 9 into electromotive force to activate the meter 12 is effected by three cooperative photoelectric devices comprising a first photoelectric cell 13 which is located to be impinged by the high intensity light zone 9 within an included angle area between the reference lines 7 and 10 while a second cell 14 is cooperatively related to the cell 13 at the horizontal line 7, and a third cell 15 is cooperatively related to the cell 13 at the vertical line 10. To cope with its dual functional relationship to the cells 14 and 15, the cell 13 is preferably larger than the other cells. The light sensitive means 13, 14 and 15 are of a type that converts light energy into electromotive force, that is, having an electrical energy output when exposed to light, the amount of energy being proportional to the intensity of light to which exposed. As shown, the cell 14 is vertically spaced a predetermined distance vertically from the cell 13 and the cell 15 is spaced a predetermined distance horizontally from the cell 13 with the respective reference lines 7 and 10 extending between the thus spaced cells and such lines being spaced a predetermined distance from each of the cells, although in practice the cell 14 could overlap the line 7 and the cell 15 could overlap the line 10.

To attain the desired results, the triad of photoelectric devices 13, 14 and 15 is electrically connected with the meter 12 in such a manner that maximum reading on the meter will occur when the edges of the intense light zone substantially coincide with the predetermined positions defined by the lines 7 and 10. To this end, electrical circuitry as best depicted in FIG. 2 connecting the meter with the light sensitive devices comprises a lead line 17 connecting the positive terminal of the meter 12 through a line 18 with the positive terminal of the device 13 which has its negative terminal connected by a line 19 with the negative terminal of the meter 12. Each of the photosensitive devices 14 and 15 has its positive terminal connected by a respective line 20 and the line 19 with the negative terminal of the device 13. At their negative terminals, the devices 14 and 15 are connected by means of a line 21 with the positive terminal of the meter 12 as through the line 17. Through this arrangement, since the photoelectric device 13 is located in the area of the high intensity zone 9 of the light beam an electromotive force is produced therein which acting on the meter 12 will cause a maximum reading thereon unless either of the devices 14 or 15 is energized by light falling thereon such that the electromotive force created therein will cause current flow therefrom through the meter 12 which is opposite to the current flow of the device 13. Furthermore, projection of light on either of the devices 14 or 15 effects a reduction in the internal resistance of such devices which allows a portion of the current produced in the device 13 to flow through the respective devices 14 and 15 to reduce the amount of current flow through the meter 12. Therefore, since the milliammeter 12 indicates the relative difference between the two currents which are flowing in opposite directions therethrough, its reading will be changed as the output of electromotive force from the device 14 or 15 increases.

To locate the edge 8 of the high intensity light zone with respect to the horizontal reference line 7, the operator moves the light beam vertically upwardly and downwardly to determine the maximum reading on the meter 12. At the maximum reading, of course, the edge 8 will be aimed to coincide with the reference line 7 and be at the predetermined position between the light sensitive devices 13 and 14. If the edge 8 is moved upwardly the output from the device 14 is increased and causes a drop in the reading of the meter. As the edge 8 is dropped, the intensity of the light projected onto the device 14 decreases, causing a decrease in its output to cause a corresponding increase in the meter reading until at coincidence of the edge 8 with the line 7, maximum meter reading will occur for such adjustment.

Similarly, to find the maximum reading of the meter 12 for horizontal adjustment of the beam pattern edge 11 with respect to the reference line 10, relative horizontal movement of the light beam to the left and then to the right will find the maximum reading position wherein the edge 11 coincides with the line 10. If the edge 11 is moved to the left, output from the device 15 increases and causes a drop in the reading of the meter. As the edge 11 is moved toward the right, intensity of the light projected on the device 15 decreases and causes a decrease in its output whereby to effect an increase in the meter reading or indication.

In order to attain a completely satisfactory adjustment of the headlight, the operator may have to take at least two readings both on the vertical adjustment and on the horizontal adjustment. After he adjusts the target member 5 or the lamp for maximum reading on the meter for vertical adjustment, the operator may then adjust the target member 5 or the lamp in the horizontal direction until the maximum reading is reached for that adjustment. Thereafter he may desirably recheck the vertical adjustment and if the target member 5 must be moved to attain the maximum reading, he then should recheck the horizontal adjustment. While there may be devices which can attain both horizontal and vertical readings in the same operation, considerably more equipment is required and thus the apparatus is more costly. For those operators who can tolerate the slightly greater manipulative effort in utilizing the present apparatus, the significantly lower apparatus cost factor is an attractive feature.

Another advantage of the present system enhancing its simplicity and economy resides in that although the photoelectric devices should be of similar characteristics, manufacturing variations therein will not affect the results attained during either testing or aiming of a headlight. There is no necessity for calibrating the photoelectric devices with respect to each other. Thus the frequently required calibration of some prior art systems is not required by the photoelectric system of the present invention.

It will be understood that variations and modifications may be effected without departing from the spirit and scope of the novel concepts of this invention.

I claim as my invention:

1. In a headlight testing system:
   means providing a target area for a high intensity light zone for a headlight beam;
   a single first light sensitive photoelectric device operatively located in an included angle area between an upper horizontal position and a lefthand vertical position at edges of said target area;
   a second light snesitive photoelectric device located cooperatively above the first light sensitive photoelectric device at said horizontal position;
   a third light sensitive photoelectric device cooperatively located to the left of said first light sensitive photoelectric device at said vertical position;
   meter means; and
   means connecting said single first light sensitive photoelectric device with said second and third light sensitive devices and said meter means in a manner for indicating the difference in the intensity of light sensed by said single first light sensitive photoelectric device and the light intensity sensed by said second and third light sensitive photoelectric devices so that the maximum indication of difference occurs when the edge of the high intensity zone substantially coincides with said positions.

2. A system according to claim 1, wherein the positions are identified by a horizontal reference line and a vertical reference line which cross one another, and said second and third light sensitive photoelectric devices being located at said horizontal and vertical lines, respectively.

3. A system according to claim 1, said meter means being connected to all three of said light sensitive photoelectric devices in a manner to register the difference of the electromotive forces produced between said first light sensitive photoelectric device and said second and third light sensitive photoelectric devices so that relative movement of the target means and the respective horizontal and vertical edges of the high intensity light zone to effect coincidence thereof with said positions effects a maximum indication on the meter means.

4. A system according to claim 1, wherein each of said light sensitive photoelectric devices has a negative terminal and a positive terminal, the negative terminal of the first device being connected operatively to the positive terminals of the second and third devices, said connected negative and positive terminals being connected to one terminal of said meter means, and the remaining terminals of said devices being operatively connected to another terminal of said meter means, whereby electromotive force current from said first device which is normally located in said light zone is opposite to the current flow of the second and third devices which are normally outside of said zone when the horizontal and vertical edges thereof are coincident with said positions.

5. A system according to claim 1, wherein said light sensitive photoelectric devices convert light energy into electromotive force and wherein the indication of the meter means is a difference of the magnitude of the electromotive force created by said light sensitive photoelectric devices connected thereto, each photoelectric device having a negative terminal and a positive terminal, the negative terminal of said one device being electrically connected with the positive terminals of the second and third devices and to one terminal of the meter means, and the remaining terminals of all three of said devices being connected to another terminal of said meter means, the arrangement being such that the difference in light intensity sensed by said one device and said second and third devices is reflected in the indication provided by said meter, so that the maximum indication of difference by said meter occurs when said horizontal and vertical edges of said zone coincide with said positions.

6. A method of testing headlights comprising:
   impinging a high intensity light beam having upper and left hand edges from a headlight onto a target area having a single first light sensitive photoelectric device operatively located in relation to an included angle area between upper horizontal and lefthand vertical positions at edges of said target area and a second light sensitive photoelectric device located cooperatively above the first light sensitive photoelectric device at said horizontal position and a third light sensitive photoelectric device cooperatively located to the left of said first light sensitive photoelectric device at said vertical position, with said single first light sensitive photoelectric devices connected to said second and said third light sensitive photoelectric devices and to meter means in a manner for indicating the difference on the intensity of light sensed by said single first light sensitive photoelectric device and said second and third light sensitive photoelectric devices; and
   on said meter means determining said difference in the inten-sity of light sensed by said single first light sensitive photoelectric device and said second and third light sensitive photoelectric devices.

7. A method according to claim 6, wherein said positions are identified by a horizontal reference line and a vertical reference line which cross one another, and determining the maximum indication of difference by said meter means including relatively moving said head light beam vertically until maximum indication of difference by the meter means occurs, and relatively moving said head light beam until maximum indication of difference by said meter means occurs, whereby said upper and left hand edges of said head light beam are moved into substantial coincidence with said reference lines.

8. A method according to claim 7, comprising, after attaining maximum indication of difference by said meter means in respect to said first light sensitive photoelectric device and either one of said second or third light sensitive photoelectric devices, rechecking the adjustment of said head light beam respect to said first light sensitive photoelectric device and the other of said second and third light sensitive photoelectric devices.

* * * * *